G. W. BILLINGS.

Railroad-Frog.

No. 7,929. Reissued Oct. 30, 1877.

Witnesses:

Thos. A. Burtt.

James C. Iden

Inventor:

Geo. W. Billings.

by J. E. Shaw,

Attorney.

N. PETERS, PHOTO-LITHOGRAPHER, WASHINGTON, D. C.

UNITED STATES PATENT OFFICE.

GEORGE W. BILLINGS, OF CHICAGO, ILLINOIS.

IMPROVEMENT IN RAILROAD-FROGS.

Specification forming part of Letters Patent No. 137,882, dated April 15, 1873; Reissue No. 7,929, dated October 30, 1877; application filed June 23, 1877.

*To all whom it may concern:*

Be it known that I, GEORGE W. BILLINGS, of Chicago, in the county of Cook and State of Illinois, have invented a certain new and Improved Railway-Frog; and I do hereby declare that the following is a full, clear, and complete description thereof, reference being had to the accompanying drawings, making part of the same.

Figure 1:
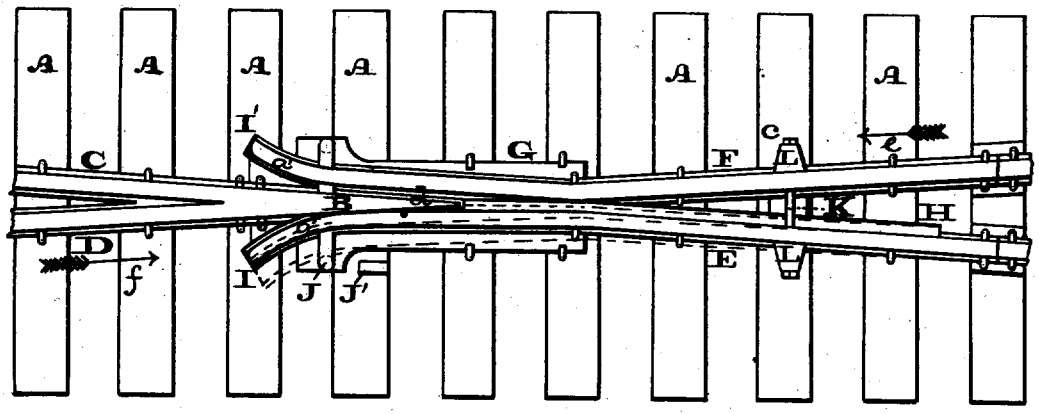
Figure 2:
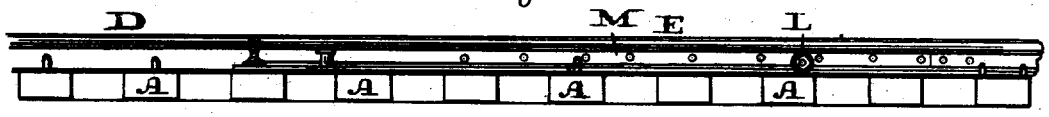
Figure 3:
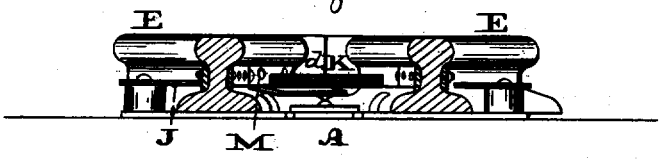
Figure 4:
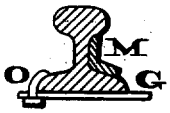
Figure 5:
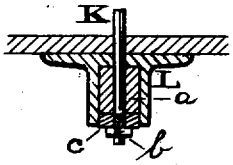

Figure 1 is a plan view of the frog. Fig. 2 is a side view. Fig. 3 is an end view, looking in direction of the arrow. Fig. 4 is an end view of a rail with its re-enforcing angle-iron attached thereto, showing the mode of fastening the bolt. Fig. 5 is a detached sectional view of the spring and housing whereby the free rail is held in place.

Like letters of reference refer to like parts in the several views.

The invention relates to improvements in spring-rail frogs; and the improvement consists in the mode of fastening the rails to the bed-plate by means of hooked bolts headed beneath the plate, and also in furnishing the housing ordinarily used to protect the rubber spring which retains the spring-rail with wings on each side, which afford a more extended bearing upon the rail.

In the drawings, A, Fig. 1, represents the ties of the road on which the rails are laid and secured in the ordinary way. B is the central section of the frog, which consists of the rails C D, each rail being the inner one of two tracks, the rail C being in the line of the rail E, and the rail D being in the line of the rail F of the two railway-tracks referred to. The rail F, corresponding in line to the rail D, is firmly fixed to the ties and bed-plate G of the frog, whereas the rail E is secured to the tie only by its end H, while its opposite end I is left free, so that it may have a lateral or transverse movement, but which, however, is prevented from displacement by a guide-bar, J, passing through the end of the rail in a slot, said bar being bolted or secured to the bed-plate, and also fastened in such manner as to be withdrawn and the spring-rail removed without lifting the frog out of the track. This is done by having the bar in a parallel form, and the slot and fastenings so arranged as to slide the bar in place without obstruction. J′ is a stop, the purpose of which is to assist in restraining the rail from too much lateral movement. K is a bolt passing through the rails E F. On each end of the bolt is a housing, L, with expanded wings, an enlarged detached sectional view of which is shown in Fig. 5. In said shell of the housing is a rubber spring, through which the bolt passes. *c* is a follower fitted in the cup of the housing so that it presses on the rubber spring, which is pressed inside by the nut *b*. By screwing the nut *b* the spring is compressed so as to entirely fill the cup of the housing, excluding the water, which often covers the track, and thereby conducing to preserve the rubber from decay. The spring thus confined acts as a relief to the spring-rail when wheels are passing through the spring-throat. In providing for the bolt through the necks of the rails a hole is necessary, and to restore the rails to their original strength the housing is made to hold the spring and bolt, and also, by the elongation of the wings fitted to the neck of the rail, the said wings act as a re-enforcement to the rail, and aid the rail to spring back to its place of rest. On the side of the spring or movable rail is secured an angle-iron, M, Fig. 2, an enlarged view of which is shown in Fig. 4, in which figure it will be seen that the angle-iron is fitted close to the web and the base of the rail, and firmly bolted thereto. By the addition of this angle-iron the strength of the rail is re-enforced; hence it is less liable to break or to bend in consequence of the force of the wheels being exerted upon it, and more especially are rails liable to such accidents when made of steel and loose, as is the re-enforced rail referred to.

The sections of the frog are secured to the bed plate or plates by hooked rivets O, Fig. 4. The hooks of the rivets are caught on the base of the rails, whereas the shank is projected through the plate and headed down, as shown in said Fig. 4. In this way of fastening down the frog the weakening of the rails by boring holes through its base, as is ordinarily done, is avoided; hence the original strength of the rail remains intact.

What I claim as my invention, and desire to secure by Letters Patent, is—

1. The hooked rivet O, in combination with the rails and bed plate or plates G, as and for the purpose set forth.

2. A railway-frog consisting of the re-enforced spring-rail E, section B, stop J′, guide-bar J, in combination with the spring *a*, winged housing L, and rod or bolt K, substantially as and for the purpose set forth.

3. The combination of the spring-rail E, housings L, and their respective inclosed rubber springs, the follower *c*, the bolt K, and its end nuts, with the guide-bar J, substantially as set forth.

4. The housing L, with its wings, in combination with an inclosed rubber spring, a follower, *c*, a movable rail, and an inserted bolt, having a bearing at one end in said follower, and at the other end in an opposing fixed rail or abutment, substantially as set forth.

GEORGE W. BILLINGS.

Witnesses:
C. L. LEWIS,
GEO. C. CAMPBELL.